United States Patent
Pierce et al.

(10) Patent No.: US 7,621,537 B2
(45) Date of Patent: Nov. 24, 2009

(54) HEIGHT CONTROL VALVE FOR VEHICLE AXLE/SUSPENSION SYSTEM

(75) Inventors: Phillippi R. Pierce, Canton, OH (US); Jesse Cervantez, Navarre, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 505 days.

(21) Appl. No.: 11/555,840

(22) Filed: Nov. 2, 2006

(65) Prior Publication Data
US 2007/0102895 A1 May 10, 2007

Related U.S. Application Data

(60) Provisional application No. 60/733,745, filed on Nov. 4, 2005.

(51) Int. Cl.
*B60G 17/016* (2006.01)
*B60G 17/052* (2006.01)
*B60G 17/056* (2006.01)

(52) U.S. Cl. .............. 280/5.514; 137/102; 138/46; 287/64.16; 280/6.157; 280/124.16

(58) Field of Classification Search ............ 137/102; 138/46; 267/64.16, 64.17, 64.28, DIG. 1, 267/DIG. 2; 280/5.514, 6.157, 6.159, 124.16
See application file for complete search history.

(56) References Cited

U.S. PATENT DOCUMENTS

| 2,925,284 A | * | 2/1960 | Bigham et al. | ............ 280/6.157 |
| 2,939,725 A | * | 6/1960 | Graham | ................... 267/64.19 |
| 2,967,064 A | | 1/1961 | Valentine | |
| 2,986,404 A | * | 5/1961 | Chuba et al. | ............. 280/6.157 |
| 2,988,378 A | * | 6/1961 | Davies | ..................... 280/5.503 |
| 2,989,983 A | * | 6/1961 | Valentine | ............... 137/601.13 |
| 3,021,151 A | * | 2/1962 | Haddad | ................... 280/6.159 |
| 3,082,018 A | * | 3/1963 | Smirl | ....................... 280/6.158 |
| 2003/0038412 A1 | * | 2/2003 | Plath | ....................... 267/64.16 |
| 2009/0033055 A1 | * | 2/2009 | Morris et al. | .......... 280/124.16 |
| 2009/0194179 A1 | * | 8/2009 | Morris et al. | .......... 137/625.11 |

FOREIGN PATENT DOCUMENTS

DE  19923456 C1  11/2000

* cited by examiner

*Primary Examiner*—Paul N Dickson
*Assistant Examiner*—Laura Freedman
(74) *Attorney, Agent, or Firm*—Krugliak, Wilkins, Griffiths & Dougherty Co., L.P.A.; David P. Dureska; Brent L. Moore

(57) ABSTRACT

A height control valve for an air spring of an air-ride axle/suspension system of a heavy-duty vehicle includes a body. The valve body is pneumatically connected to an air reservoir of the vehicles an ail spring, and to atmosphere A control arm actuates the valve to direct air from the reservoir into the air spring, when air is to be added to the air spring When air is to be exhausted from the air spring, the valve, actuated by the control arm, directs air from the air spring to atmosphere The valve includes a throttle assembly that can regulate the rate of pneumatic flow from the air spring to atmosphere when the vehicle is loaded and the air spring is in an extended condition. A throttle assembly can also be used to regulate the rate of pneumatic flow from the air reservoir to the air spring.

12 Claims, 7 Drawing Sheets

FROM AIR RESERVOIR

HEIGHT CONTROL VALVE FOR VEHICLE AXLE/SUSPENSION SYSTEM

CROSS-REFERENCE TO RELATED APPLICATION

This application claims the benefit of U.S. Provisional Patent Application Ser. No. 60/733,745, filed Nov. 4, 2005.

BACKGROUND OF THE INVENTION

1. Technical Field

The present invention relates to the art of air-ride axle/suspension systems for heavy-duty vehicles, such as tractor-trailers or semi-trailers, which cushion the ride and stabilize the vehicle during operation. More specifically, the invention relates to pneumatic control of the air springs of an air-ride axle/suspension system, and in particular to a height control valve which regulates the flow of air out of the air springs.

2. Background Art

Heavy-duty vehicles, such as tractor-trailers or semi-trailers, typically include one or more leading or trailing arm suspension assemblies that connect the wheel-bearing axles of the vehicle to the frame of the vehicle. Early suspension designs included heavy spring suspensions which resulted in a relatively rough ride to the caigo and did not allow loads to equalize among the axles in all situations, thus creating the need for a suspension system with soft ride characteristics and efficient equalization characteristics. The subsequent development of air suspension systems provided load equalization among multiple axles for semi-trailers as well as improved tide quality for individual axles.

As a result, heavy-duty vehicles that transport freight often include leading or trailing arm air-ride axle/suspension systems, which use air springs to cushion the ride of the vehicle Pneumatic control of these air springs is an important feature of air-ride axle/suspension systems.

More particularly, it is important for a cushioned vehicle ride, and for optimum axle/suspension system performance and longevity, to attempt to maintain a consistent, predetermined distance between the vehicle frame and the travel surface This predetermined distance is known in the art as the design ride height of the vehicle. To establish the design ride height of a vehicle, the operating conditions of the vehicle must be considered. That is, when a heavy-duty vehicle executes certain maneuvers, such as making a hard turn or traveling over rough terrain, the forces imposed on the axle/suspension system by such maneuvers cause the axle/suspension system to articulate, or pivot and/or flex beneath the vehicle frame which the system supports. Typically, an axle/suspension system is designed so that the anticipated range of articulation occurs about a nominal predetermined position, and that nominal position is set as the design ride height of the vehicle.

After a heavy-duty vehicle is loaded with freight, or freight is unloaded from the vehicle, the air springs of the axle/suspension system are adjusted to ensure that the vehicle is at design ride height before traveling. That is, when the vehicle is loaded with freight and the air springs of the axle/suspension system are compressed causing the vehicle frame to be positioned below design ride height or closer to the travel surface, compressed air is supplied to the air springs, thereby inflating/extending them and in turn causing the axle/suspension system to raise the vehicle frame to the design ride height Conversely, when the vehicle is unloaded and the air springs of the axle/suspension system are extended causing the vehicle frame to be positioned above design tide height or further away from the travel surface, air is exhausted from the air springs, thereby deflating/compressing them until the axle/suspension system lowers the vehicle frame to the design ride height. To control the flow of air into the air springs, and the exhaustion of air from the air springs, a mechanically operated valve typically is employed, and is known in the art as a height control valve or leveling valve. Adjustments to the height control valve and the linkage that controls activation of the valve enable the design ride height to be achieved before the vehicle travels over the road.

As the vehicle travels over the road and the driver executes maneuvers that cause the axle/suspension system to articulate between a position that compresses the air springs and a position that extends them, the height control valve acts to maintain the design ride height That is, when the air springs are compressed, the height control valve supplies air to the springs from a vehicle air reservoir. Conversely, when the air springs are in an extended position, the height control valve exhausts air from the springs to atmosphere The amount of air that is supplied or exhausted is based on the duration of the articulation and the flow late of the height control valve at a given position. However, height control valves of the prior art sometimes allow over-exhaustion of air from the air springs when the vehicle is loaded.

More particularly, when a vehicle is carrying significant cargo, an increased load is placed on the air springs of the axle/suspension system. In response to such an increased load, the height control valve introduces compressed air from the vehicle air reservoir into the air springs, thereby increasing the air pressure within the air springs in older to regain and maintain design ride height. Then, when exhaustion of air from the air springs is necessary to maintain design ride height, the increased pressure in the air springs raises the rate of flow of air exiting the air springs through the height control valve. Such a potentially increased rate of exhaust may enable too much compressed air to exit the air springs, thereby reducing the ability of the compressed air reservoir to rapidly re-inflate the air springs when required. For example, typical air spring pressures on a loaded vehicle may be between about 90 pounds per square inch (psi) and about 100 psi, which means that, for a loaded vehicle, the typical pressure differential between the air springs and atmosphere is from about 90 psi to about 100 psi Vehicle air reservoir pressures typically are between about 100 psi to about 130 psi. Therefore, the typical pressure differential between the vehicle air reservoir and the air springs may range from about 0 psi to about 40 psi. Since height control valves of the prior art exhaust air at a rapid rate, when the air springs are under an increased load from a freight-laden vehicle, this pressure differential may be too small to enable the vehicle air reservoir to provide sufficient compressed air to the air springs for regaining and maintaining design ride height in certain instances.

Thus, for a loaded vehicle, when the axle/suspension system articulates so that one or more of the air springs is in an extended position and the height control valve of the prior art exhausts air from the springs, the air may exhaust so rapidly that the reservoir may not be able to supply enough compressed air to rapidly refill the air springs when the event causing the extension has passed. More specifically, such a rapid refill may be necessary if the axle/suspension system articulates quickly to an air spring compressed position after it has articulated to the air spring extended position, which may be encountered in vehicle maneuvers such as turning or driving over rough terrain. As a result, when the axle/suspension system then articulates to the air spring compressed position, the actual ride height may be undesirably below the design ride height. This is referred to as dynamic ride height drift. In a maneuver such as a hard turn, the dynamic ride height drift may be considerable.

Therefore, if the amount of air that the height control valve permits to be exhausted is too great, the axle/suspension system might not be able to maintain the design ride height, which potentially can lead to damage of the axle/suspension system. More particularly, the air springs of the axle/suspension system can become damaged when the pressure within the air springs is too low to maintain design ride height This potential damage can occur when the internal bumper within the air spring contacts the air spring bead plate with a violent blow or series of blows. In addition, other vehicle damage such as crushed frame cross members and/or bent suspension beams can also occur. This disadvantage of prior art height control valves makes it desirable to develop a height control valve that is capable of regulating the exhaust rate on a loaded vehicle The present invention solves the above-described problem involving rapid exhaustion of air from the air spring of an axle/suspension system through the height control valve of a loaded vehicle by utilizing a height control valve that regulates the exhaust late of air from the air spring If desired, the concepts of the present invention may also be applied to a related problem where the height control valve of an unloaded or lightly loaded vehicle over-inflates the air spring with air supplied from the air reservoir. By providing a height control valve that is capable of regulating the rate of air flow from the air reservoir into the air spring, over-inflation of the air spring can be minimized or prevented.

SUMMARY OF THE INVENTION

An objective of the present invention is to provide a height control valve for an air spring of an axle/suspension system of a heavy-duty vehicle that regulates the exhaust rate of air from the air spring when the air spring is in an extended position and the vehicle is loaded.

Another objective of the present invention is to provide a height control valve for an air spring of an axle/suspension system of a heavy-duty vehicle that regulates the rate of flow of air from the air reservoir into the air spring when the air spring is compressed and the vehicle is unloaded or lightly loaded.

Yet another objective of the present invention is to provide a height control valve for an air spring of an axle/suspension system of a heavy-duty vehicle that is durable in use and cost effective to install and maintain.

These objectives and advantages are obtained by the height control valve for an air spring of an air-ride axle/suspension system of a heavy-duty vehicle of the present invention. An exemplary embodiment of the height control valve includes a valve body being in fluid communication with an air reservoir, with the air spring, and with atmosphere, actuation means operatively connected to the valve body and the axle/suspension system for actuating the valve, and a throttle assembly incorporated into the valve body, so that upon actuation of the valve by the actuation means when the vehicle is in a loaded condition and the air spring is in and extended state during operation of the vehicle for exhausting fluid from the air spring, the throttle assembly regulates a rate of flow of the fluid from the air spring to generally maintain a predetermined ride-height of the vehicle.

These objectives and advantages are also obtained by a second exemplary height control valve for an air spring of an air-ride axle/suspension system of a heavy-duty vehicle of the present invention. A second exemplary embodiment of the height control valve includes a valve body being in fluid communication with an air reservoir, with the air spring, and with atmosphere, actuation means operatively connected to the valve body and the axle/suspension system for actuating the valve, and a throttle assembly incorporated into the valve body, so that upon actuation of the valve by the actuation means when the vehicle is in a substantially unloaded condition and the air spring is in a compressed state during vehicle operation for filling fluid into the air spring, the throttle assembly regulates a rate of flow of the fluid into the air spring to generally maintain a predetermined ride-height of the vehicle.

BRIEF DESCRIPTION OF THE DRAWINGS

Exemplary embodiments of the present invention, illustrative of the best modes in which applicants have contemplated applying the principles, are set forth in the following description and are shown in the drawings.

Similar numerals refer to similar parts throughout the drawings.

DESCRIPTION OF THE PREFERRED EMBODIMENTS

Figure 1:
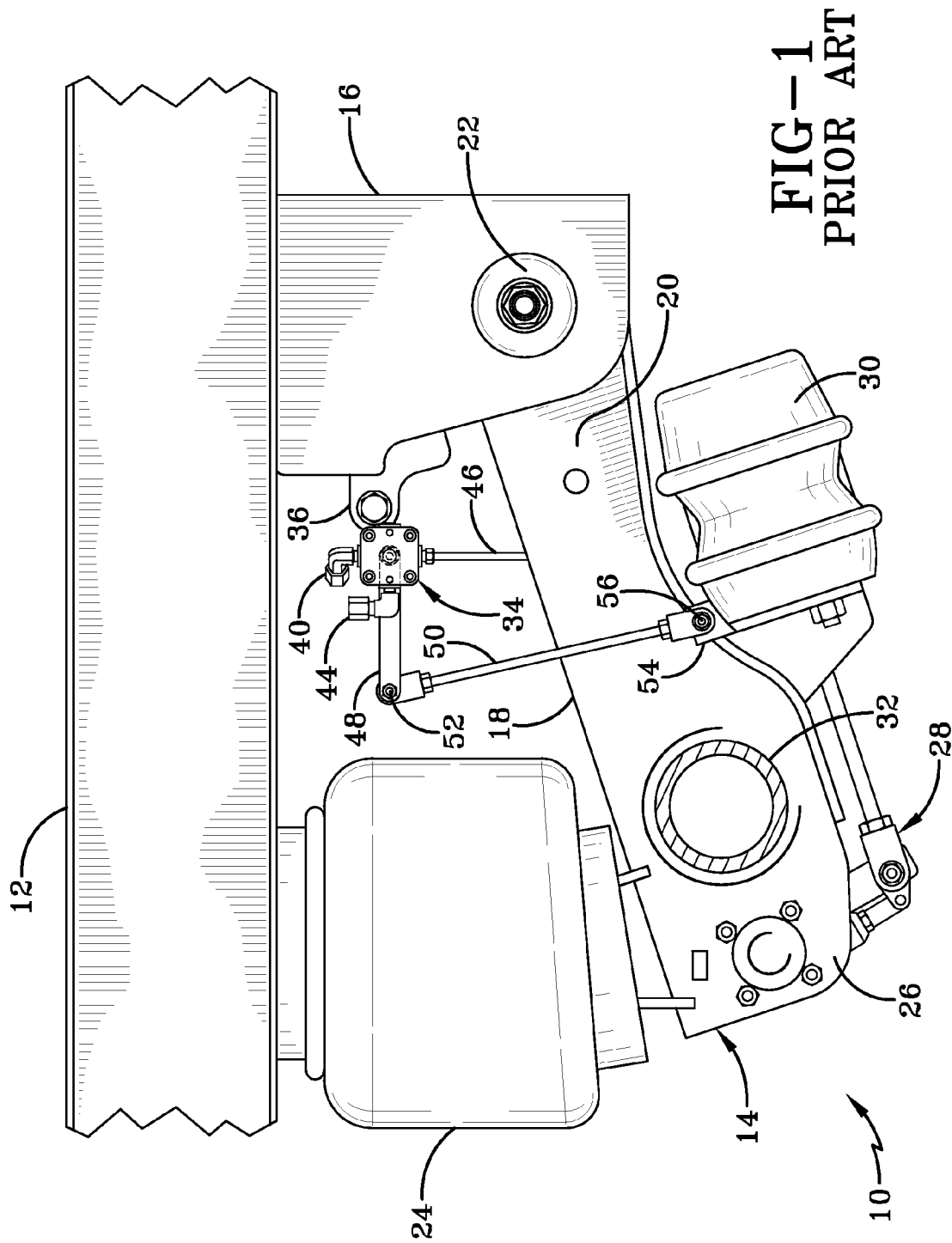
FIG. 1 is a fragmentary elevational view, with portions in section, of one of the suspension assemblies and an axle of an air-ride trailing arm beam-type axle/suspension system, shown depending from a heavy-duty vehicle frame, and further showing a height control valve of the prior art.

So that the structure, operation, and advantages of the improved height control valve for an air spring of an axle/suspension system of a heavy-duty vehicle can be best understood, a prior art height control valve 34 for an air spring is shown in FIG. 1 mounted on an air-ride axle/suspension system, indicated generally at 10, which in turn is mounted on a heavy-duty vehicle frame 12, and now will be described in the environment in which it is utilized. It is important to note that prior art air-ride axle/suspension system 10, while shown as a specific type of trailing arm axle/suspension system, also includes other types of heavy-duty vehicle air-ride suspension assemblies known to those skilled in the art, such as other types of trailing arm and leading arm air-ride suspension assemblies It also is important to note that vehicle frame 12 is generally representative of various types of frames used for heavy-duty vehicles, including primary frames that do not support a subframe, and primary frames and/or floor structures that do support a subframe. For primary frames and/or floor structures that do support a subframe, the subframe can be non-movable or movable, the latter being commonly referred to as a slider box.

Axle/suspension system 10 includes a pair of generally identical suspension assemblies 14 each suspended from a respective one of a pair of transversely spaced frame hangers 16. Each hanger 16 is secured to and depends from frame 12 of the heavy-duty vehicle. Inasmuch as suspension assemblies 14 are identical, only one will be described herein below and shown in FIG. 1. Suspension assembly 14 includes a trailing arm-type suspension beam 18 which is pivotally mounted at its front end 20 on hanger 16 in a usual manner through the use of a suitable pivot and bushing assembly 22. An air spring 24 is suitably mounted on and extends between the upper surface of a rear end 26 of suspension beam 18 and frame 12. A shock absorber (not shown) also typically is mounted on and extends between beam 18 and frame 12. A brake chamber 30 and other components of a brake system 28 are shown attached to beam 18 by way of example, as it is to be understood that other arrangements for attaching components of the brake system to an axle/suspension system 10 are known in the art. An axle 32 extends between and is captured in the pair of suspension beams 18, and one or more wheels (not shown) are mounted on each end of the axle.

Figure 2:
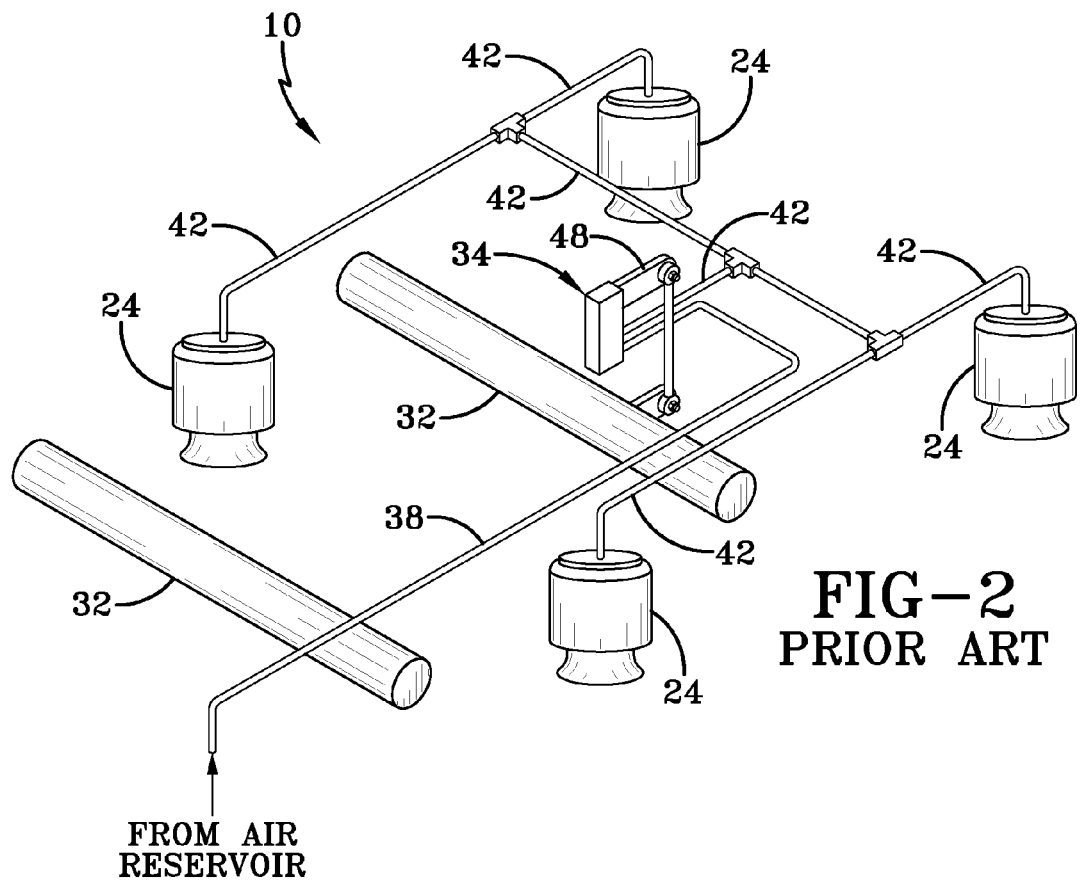
FIG. 2 is a schematic representation of a typical pneumatic conduit system for a height control valve of the prior art, and showing relative positions of the air springs and axles of a pair of air-ride axle/suspension systems.

Prior art height control valve 34 is shown mounted on hanger 16 via a bracket 36. With additional reference to FIGS. 2 and 3, an air reservoir conduit 38 is pneumatically connected to height control valve 34 via an air reservoir fitting 40, and provides compressed air to the height control valve from an air reservoir, such as an air tank (not shown), as known to those skilled in the art. An air spring conduit 42 is pneumatically connected to height control valve 34 via an air spring fitting 44 and branches off to each air spring 24, thereby enabling the height control valve to route compressed air to and from the air springs based on certain operational conditions, as will be described below An exhaust conduit 46 is pneumatically connected to and extends from height control valve 34, enabling the height control valve to exhaust compressed air to atmosphere, as will also be described in detail below It is to be understood that additional pneumatic and/or electronic components (not shown) that are known and used in the art, such as electronic controllers, valves, vents and pneumatic lines, may be used in conjunction with conduits 38, 42, 46 and/or height control valve 34. For example, components of an air spring control system as disclosed in U.S. Pat. No. 6,412,789, issued to Pierce et al on Jul. 2, 2002, and assigned to Hendrickson USA., L.L.C., the assignee of the present invention, may be used.

Figure 3:
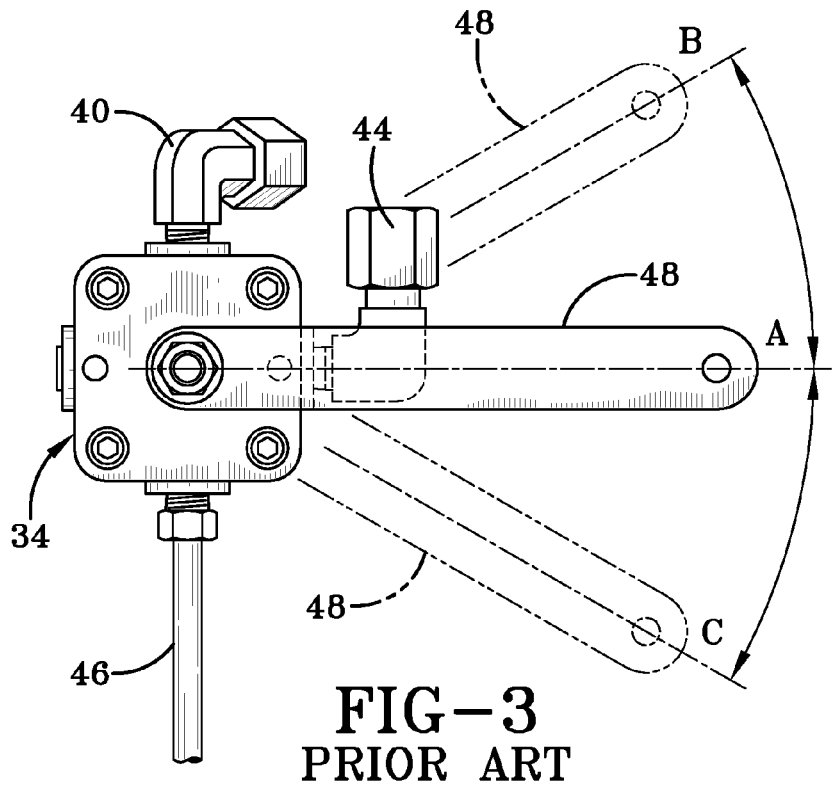
FIG. 3 is an enlarged elevational view of the prior art height control valve of FIG. 1, with alternate valve control arm positions represented by broken lines.

Referring now to FIGS. 1 and 3, height control valve 34 preferably is a three-way valve that includes a control arm 48, wherein the position of the arm controls the operation of the height control valve More particularly, when control arm 48 is in a horizontal or neutral position A, height control valve 34 is closed and does not route compressed air from air reservoir conduit 38 (FIG. 2) to air springs 24 via air spring conduit 42, nor does it exhaust air from the air springs to atmosphere. When control arm 48 is in a fill position B, height control valve 34 routes compressed air from air reservoir conduit 38 to air spring conduit 42 (FIG. 2) and thus to air springs 24, thereby inflating the air springs When control arm 48 is in an exhaust position C, height control valve 34 exhausts air from air springs 24 via air spring conduit 42, and communicates the exhausted air to exhaust conduit 46 (FIG. 2) and thus to atmosphere.

Automatic actuation of control arm 48, and thus activation of the operation of height control valve 34, is provided by a control valve link 50, as shown in FIG. 1 More specifically, control valve link 50 is pivotally connected at its upper end to control arm 48 via fasteners 52 or other means known in the art, and is also pivotally connected at its lower end via mounting bracket 54 and fasteners 56 to beam 18, or to a component that is attached to the beam, such as brake chamber 30.

During vehicle operation, when axle/suspension system 10 articulates to an air spring compressed position, the distance between vehicle frame 12 and beam 18 decreases, compressing air spring 24 Since height control valve 34 is connected to hanger 16, which is rigidly connected to vehicle frame 12, the height control valve remains a generally consistent distance from the vehicle frame. To maintain design ride height, when the distance between vehicle frame 12 and beam 18 decreases, control valve link 50 moves control arm 48 upwardly from neutral position A to fill position B, as shown in FIG. 3, thereby activating height control valve 34 and causing the height control valve to route compressed air from air reservoir conduit 38 to air spring 24, thereby inflating air spring 24, and in turn returning beam 18 to the design ride height.

Conversely, when axle/suspension system 10 articulates to an air spring extended position, the distance between vehicle frame 12 and beam 18 increases, extending air spring 24. To maintain ride height, when the distance between vehicle frame 12 and beam 18 increases, control valve link 50 moves control arm 48 downwardly from neutral position A to exhaust position C, as shown in FIG. 3, thereby activating height control valve 34 and causing the height control valve to exhaust compressed air from air spring 24 to exhaust conduit 46, and in turn returning beam 18 to the design ride height.

As mentioned above, a potential disadvantage of prior art height control valve 34 is its tendency to allow air springs 24 to over-exhaust air from one or more of the air springs on a freight-laden vehicle when the air springs are extended That is, height control valve 34 includes an exhaust orifice (not shown) that is a simple, generally straight-walled orifice which does not enable the height control valve to regulate the rate of exhaust of air springs 24. As a result, when the vehicle is loaded, the compression force on air springs 24 is increased and thus the rate of air flow from the air springs is also increased, and height control valve 34 may allow the air springs to exhaust air too quickly during an event where the air springs become extended, which may in turn allow an excessive amount of air to exhaust from the air springs When this occurs, and axle/suspension system 10 then articulates to an air spring compressed position, requiring air springs 24 to be rapidly inflated to maintain proper design ride height, the air reservoir may not be able to provide sufficient air to effectively inflate the air springs. This is due to the condition in which, as described above, the pressure differential between the vehicle reservoir and air springs 24 is too small to enable the vehicle reservoir to provide enough compressed air to rapidly inflate the exhausted air springs.

Thus, when axle/suspension system 10 articulates to an air spring compressed position and one or more of the air springs 24 have been exhausted due to a temporary extension of the air springs, the actual ride height of the vehicle may undesirably drop below the design ride height due to the rapid exhaustion of air from the air spring and the inability of the air reservoir to refill the air springs at a sufficiently rapid rate, which may potentially damage the axle/suspension system. This disadvantage of prior art height control valve 34 has created a need in the art for a height control valve that is capable of regulating its exhaust rate, and therefore the exhaust rate of air springs 24, particularly on a vehicle loaded with freight. The present invention satisfies this need, as will now be described.

Figure 4:
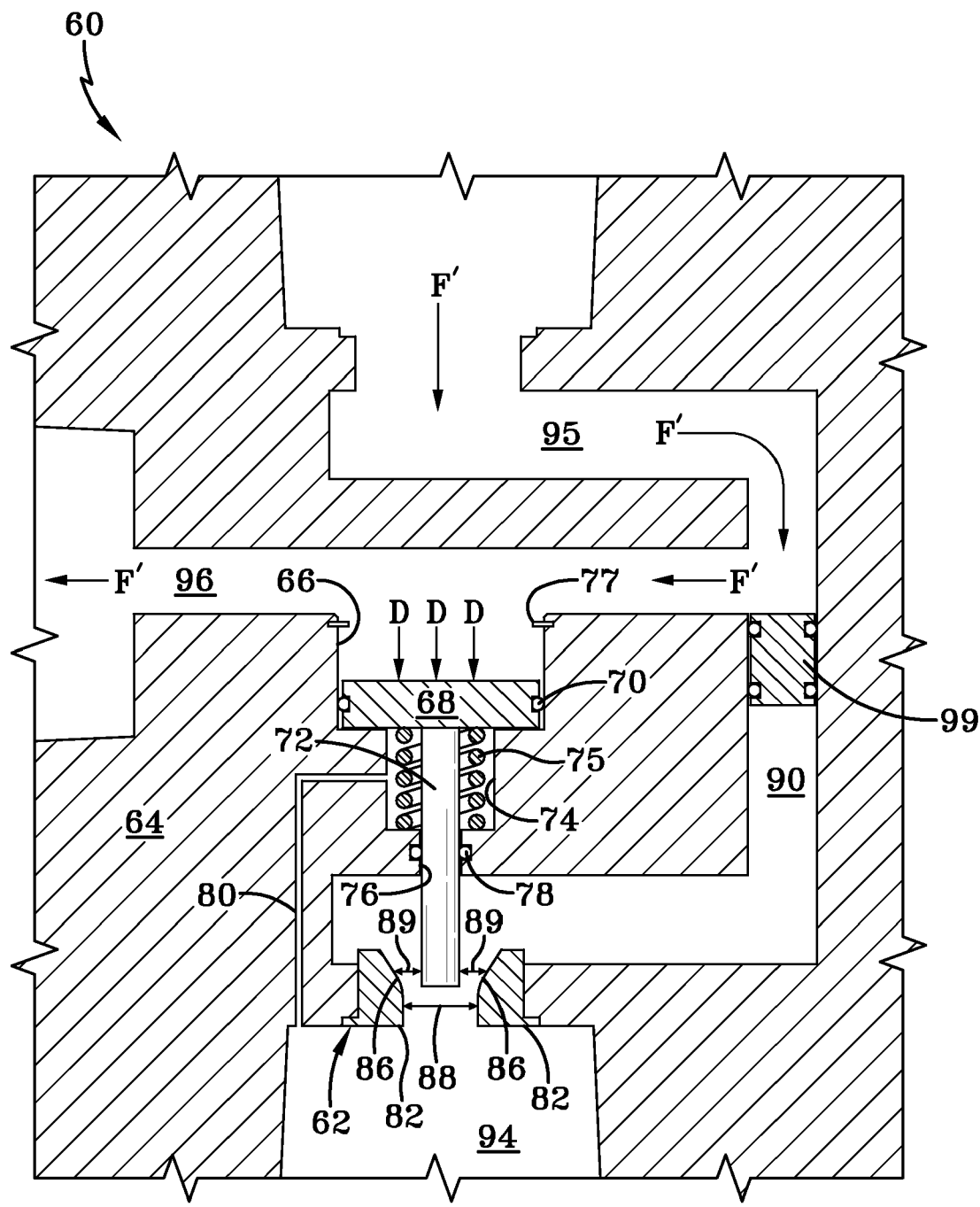
FIG. 4 is a cross-sectional fragmentary schematic view of an exemplary first embodiment height control valve of the present invention, showing the valve baffle in a fill position and corresponding air flow from the air reservoir to the air spring through the height control valve.
Figure 4A:
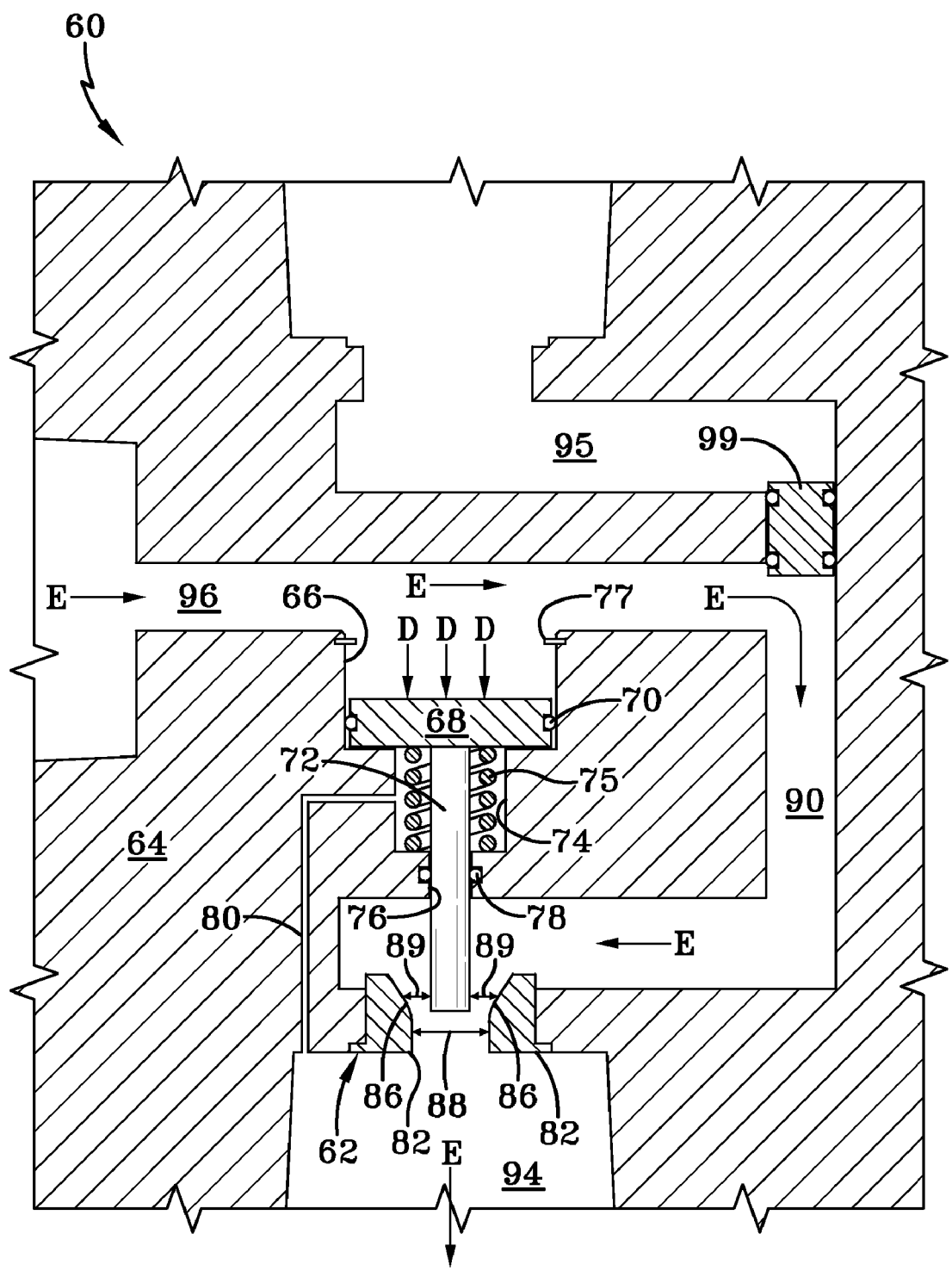
FIG. 4A is a view similar to FIG. 4, but showing the valve baffle in an exhaust position and the corresponding air flow from the air spring to atmosphere through the height control valve, with the throttle assembly of the height control valve in a throttled or regulating position.
Figure 5:
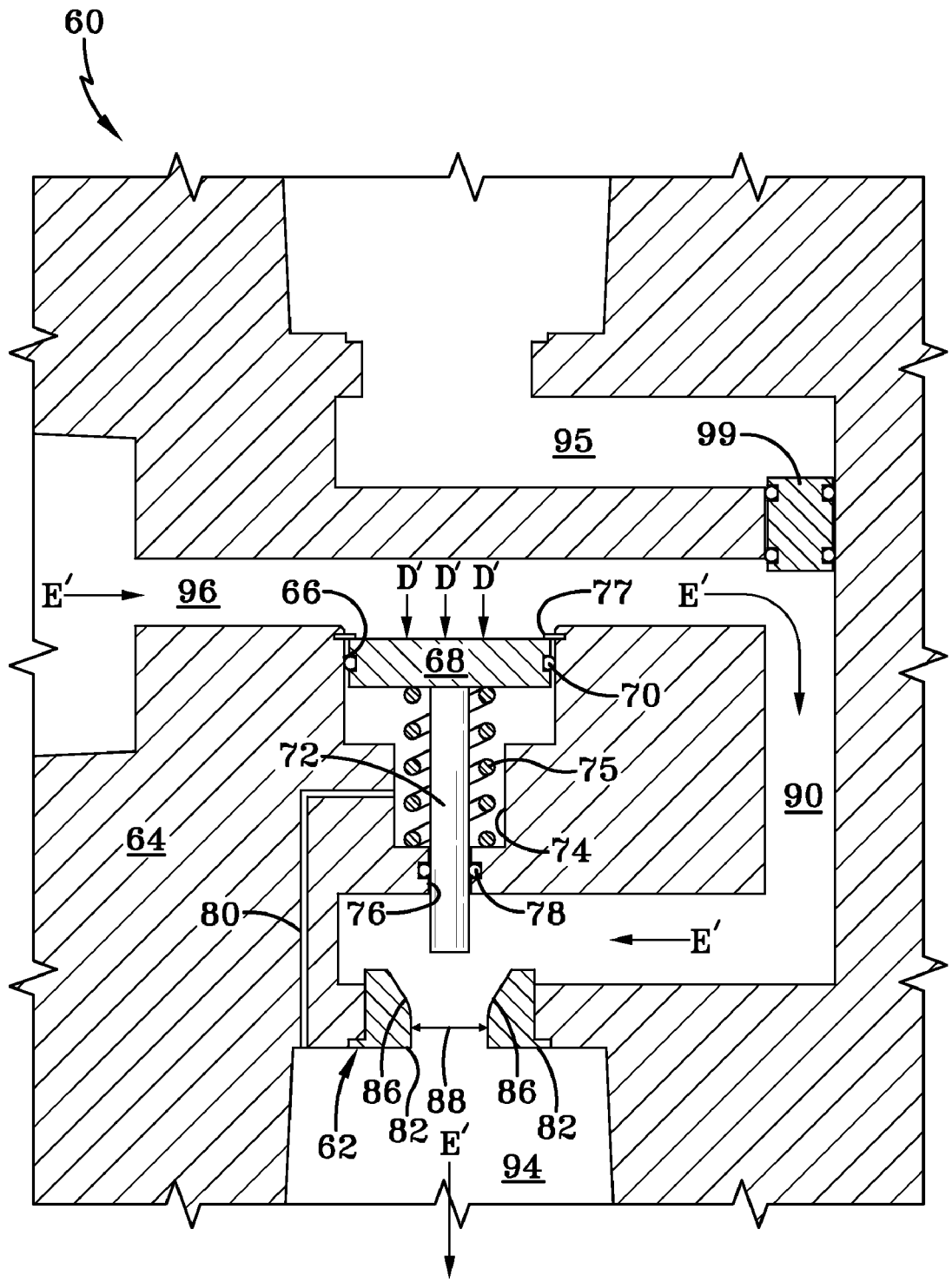
FIG. 5 is a view similar to FIG. 4A, but with the throttle assembly shown in a non-throttled or non-regulating position.

Turning now to FIGS 4, 4A, and 5, an exemplary first embodiment of the height control valve of the present invention is schematically shown and is indicated generally at 60. The general external appearance, control arm disposition and operation, and installation of height control valve 60 of the present invention, are similar to that of prior art control valve 34 shown in FIG. 1, with the principal difference being the internal structure and function of the inventive height control valve for regulating the rate of its air exhaust Therefore, only the differences between height control valve 60 of the present invention and prior art height control valve 34 now will be described.

As mentioned above, prior art height control valve 34 includes an exhaust orifice that is a generally straight-walled orifice (not shown) pneumatically connected to exhaust conduit 46. In contrast, height control valve 60 of the present invention includes a throttle assembly 62 that is pneumatically connected to an exhaust conduit (not shown) which enables regulation of the rate of air exhaust of the height control valve With particular reference to FIG. 4, height control valve 60 and throttle assembly 62 are shown in a state when a vehicle on which they are used is significantly loaded with freight, whereby an increased load is placed on air springs 24 and causes compression of one or more of the air springs (FIG. 1) As a result, control lever 48 is urged upwardly into fill position B (FIG. 3), a valve baffle 99 is urged into a valve exhaust conduit 90, and air is supplied to air springs 24 from the air reservoir via air reservoir conduit 38 (FIG. 2), a valve air reservoir conduit 95, a valve air spring conduit 96, and air spring conduits 42 (FIG. 2), as indicated by arrows F', in order to maintain the vehicle at design ride height. Throttle assembly 62 includes a throttle assembly body 64 that preferably is an integral part of height control valve 60, or may alternatively be a discrete unit, in which a cylinder 66 is formed A piston 68 is disposed in cylinder 66 and an air pressure within height control valve 60, indicated by arrows D, compresses the piston in the cylinder An O-ring 70 is secured about the outer diameter of piston 68 to prevent air from passing between the walls of the piston and cylinder 66, thereby enabling efficient compression of the piston.

With particular reference to FIG. 4A, when axle/suspension system 10 (FIG. 1) articulates to an air spring extended position due to an event such as a hard turn of the vehicle, height control valve 60 is activated and exhausts air from one or more of air springs 24 in order to lower axle/suspension system 10 to the design ride height. More particularly, control lever 48 is now urged downwardly into exhaust position C and valve baffle 99 is urged into valve air reservoir conduit 95 allowing air from air springs 24 to exhaust to atmosphere. More specifically, during exhaustion, pressurized air from air springs 24 passes through air spring conduits 42 (FIG. 2) to height control valve 60, into valve air spring conduit 96, into valve exhaust conduit 90, through a tapered ring 82, into a valve exit chamber 94, and out of exhaust conduit 46 (FIG. 2) to atmosphere, as indicated by arrows E Once inside height control valve 60, the pressurized air from air springs 24 creates air pressure D within the height control valve. Therefore, air pressure D, which acts on piston 68, corresponds to the air pressure in air springs 24 When the vehicle is significantly loaded, as opposed to lightly loaded or unloaded, thereby imparting a higher load on air springs 24 and thus resulting in an increased air pressure in the air springs, pressure D acting on piston 68 is correspondingly increased. As described above, it is this increased air pressure in air springs 24 that can result in an increased rate of air flow out of the air springs during exhaustion, which prior art height control valve 34 does not restrict, regulate, or otherwise control, possibly leading to over-exhaustion of the air springs and in turn potential inability of the system to provide air to the air springs in order to maintain design ride height.

In contrast, in height control valve 60 of the present invention, increased air pressure D causes throttle assembly 62 to restrict air flow out of the height control valve when the vehicle is loaded with freight and when control lever 48 is in the exhaust position C In particular, air pressure D compresses piston 68, which is operatively connected to a plunger 72 Plunger 72 passes through a chamber 74 formed in throttle assembly body 64 and which is in communication with cylinder 66. More specifically, a spring 75 preferably is disposed in chamber 74 about plunger 72, and biases piston 68 in the direction of and into contact with a positive stop 77 when there is little or no air pressure in throttle assembly 62 When increased air pressure D is present, such as when the vehicle is loaded with freight, the increased air pressure overcomes the bias of spring 75, urging piston 68 in the direction of chamber 74, which in turn compresses the spring. Plunger 72 extends through a plunger opening 76 that is formed in throttle assembly body 64, and which is in communication with chamber 74 An O-ring 78 is secured to throttle assembly body 64 in plunger opening 76 to prevent air from flowing back into chamber 74. A vent channel 80 is formed in throttle assembly body 64 and also communicates with chamber 74 to provide a vent for the chamber, thereby allowing piston 68 to move.

As air pressure D in height control valve 60 increases, piston 68 moves against the bias of spring 75 and urges plunger 72 in the direction of tapered ring 82 disposed in throttle assembly body 64 Alternatively, tapered ring 82 may be formed as an integral part of throttle assembly body 64 Tapered ring 82 is formed with a decreasing inner diameter facilitated by a tapered inner wall 86 of the ring, thereby defining a ring opening 88. Plunger 72 preferably includes a generally constant outer diameter that is smaller than the minimum inner diameter of tapered ring 82, which enables the plunger to pass freely into ring opening 88, thereby in turn defining a space 89 between the plunger and ring wall 86. Due to the taper of ring wall 86, the effective size of space 89 between plunger 72 and the ring wall decreases as air pressure D increases. That is, when air pressure D is lower, plunger 72 does not extend completely into ring opening 88, and thus space 89 between the plunger and ring wall 86 is larger than when the air pressure increases, which urges the plunger further into the ring opening In this manner, as air pressure D increases, plunger 72 is urged further into opening 88, and the decreasing inner diameter of tapered wall 86 thus decreases the effective size of space 89 between the plunger and the ring wall, the benefit of which will be described below.

As noted above, height control valve 60 also includes valve exhaust conduit 90 formed in throttle assembly body 64, through which air exhausted from air springs 24, represented by arrows E, passes. Exhausted air E passes through valve exhaust conduit 90 into throttled space 89 provided between plunger 72 and tapered ring wall 86. Upon passing through space 89 and ring opening 88, exhausted air E passes into an exit chamber 94 formed in throttle assembly body 64 and which communicates with the ring opening, and then to exhaust conduit 46 (FIG. 1) In this manner, the movement of plunger 72 into ring opening 88, which increases as air pressure D increases, enables height control valve 60 to restrict the flow of air being exhausted from air springs 24 when the vehicle is loaded with freight and executes a maneuver, such as a hard turn, which causes axle/suspension system 10 to articulate to a position that extends air springs 24. This structure and function of height control valve 60 and its throttle assembly 62 thus prevents the undesirably rapid exhaustion of air from air springs 24 when the vehicle is loaded and the air springs are temporarily extended, reducing over-exhaustion of the air springs. Reduction of over-exhaustion of air springs 24 in turn enables the air reservoir (not shown) to inflate the air springs more rapidly when required after the event causing such regulated exhaustion has passed, thereby enabling the vehicle to maintain the design ride height and reduce potential damage to axle/suspension system 10.

With reference now to FIG. 5, height control valve 60 and throttle assembly 62 are shown in a state when the vehicle is unloaded or lightly loaded, which reduces the load on air springs 24 (FIG. 1) Since the load on air springs 24 is reduced, the air pressure in the air springs is reduced, which in turn reduces the rate of air flow out of the air springs when height control valve 60 is activated to exhaust the air springs Since the air flow E' out of air springs 24 is reduced, the potential for over-exhaustion of the air springs is in turn reduced. Accordingly, height control valve 60 accounts for this and provides less of an air flow restriction, when compared to the loaded-vehicle condition shown in FIG. 4A.

More specifically, the reduced air pressure in air springs 24 creates a reduced air pressure D' acting on piston 68. The reduced air pressure D' provides comparatively less or no force on piston 68, which reduces or eliminates the movement of plunger 72. More particularly, spring 75 moves to its biased or extended position, pushing piston 68 in the direction of and into contact with positive stop 77. In other words, reduced air pressure D' does not overcome the bias of spring 75, and piston 68 therefore does not urge plunger 72 in the direction of tapered ring 82, and the plunger does not extend into ring opening 88. Without plunger 72 extending into ring opening 88, the maximum exhaust opening size is available, thereby allowing more exhausted air E' to pass from air springs 24 through valve exhaust conduit 90 valve exit chamber 94, and out of exhaust conduit 46 to atmosphere.

In this manner, the present invention provides a height control valve 60 with a variable air exhaust rate that is based on vehicle load, to compensate for dynamic ride height drift Height control valve 60 of the exemplary embodiment of the present invention regulates the rate of flow of air being exhausted from air springs 24 by automatically reducing or restricting its exhaust path when the vehicle is loaded That is, throttle assembly 62 of height control valve 60 reduces the cross-sectional area of the exhaust path as air spring pressure increases due to the loaded state of the vehicle, thus reducing the exhaust flow rate This structure and function of height control valve 60 and throttle assembly 62 thereby prevent the rapid escape of air from air springs 24 of a loaded vehicle when a maneuver is executed that extends the air springs, in turn reducing the possibility of over-exhaustion of the air springs. Reduction of possible over-exhaustion of air springs 24 enables the vehicle air reservoir to inflate the air springs more rapidly when required, thus enabling the vehicle to maintain the design ride height and reduce potential damage to axle/suspension system 10.

Figure 6:
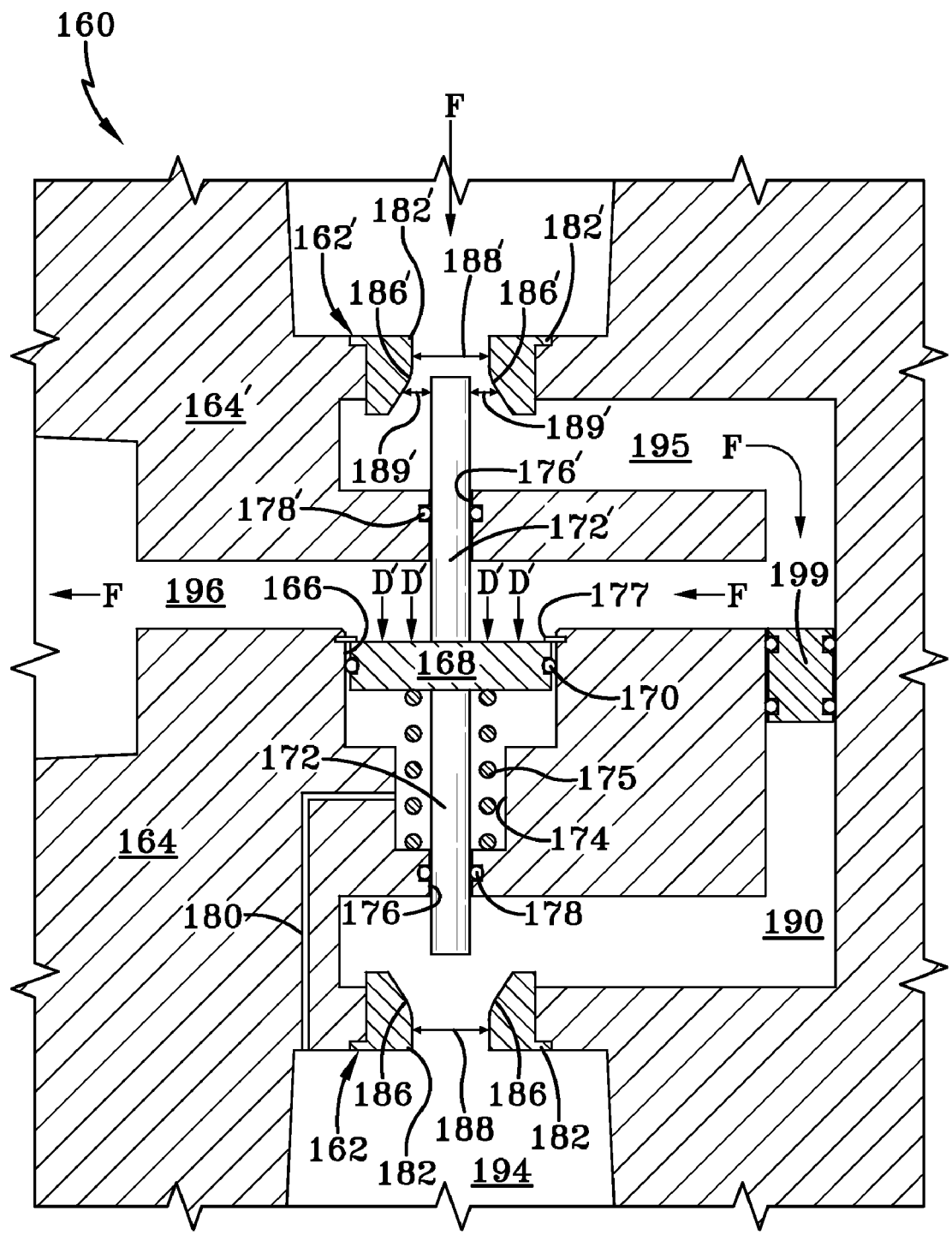
FIG. 6 is a cross-sectional fragmentary schematic view of an exemplary second embodiment height control valve of the present invention, showing a dual throttle assembly for not only regulating the rate of air flow between the air spring and atmosphere, but also for regulating the rate of air flow between the air reservoir and the air spring, showing the valve baffle in a fill position, and showing the air reservoir/air spring throttle assembly in a throttled position and the air spring/atmosphere throttle assembly in a non-throttled position.
Figure 7:
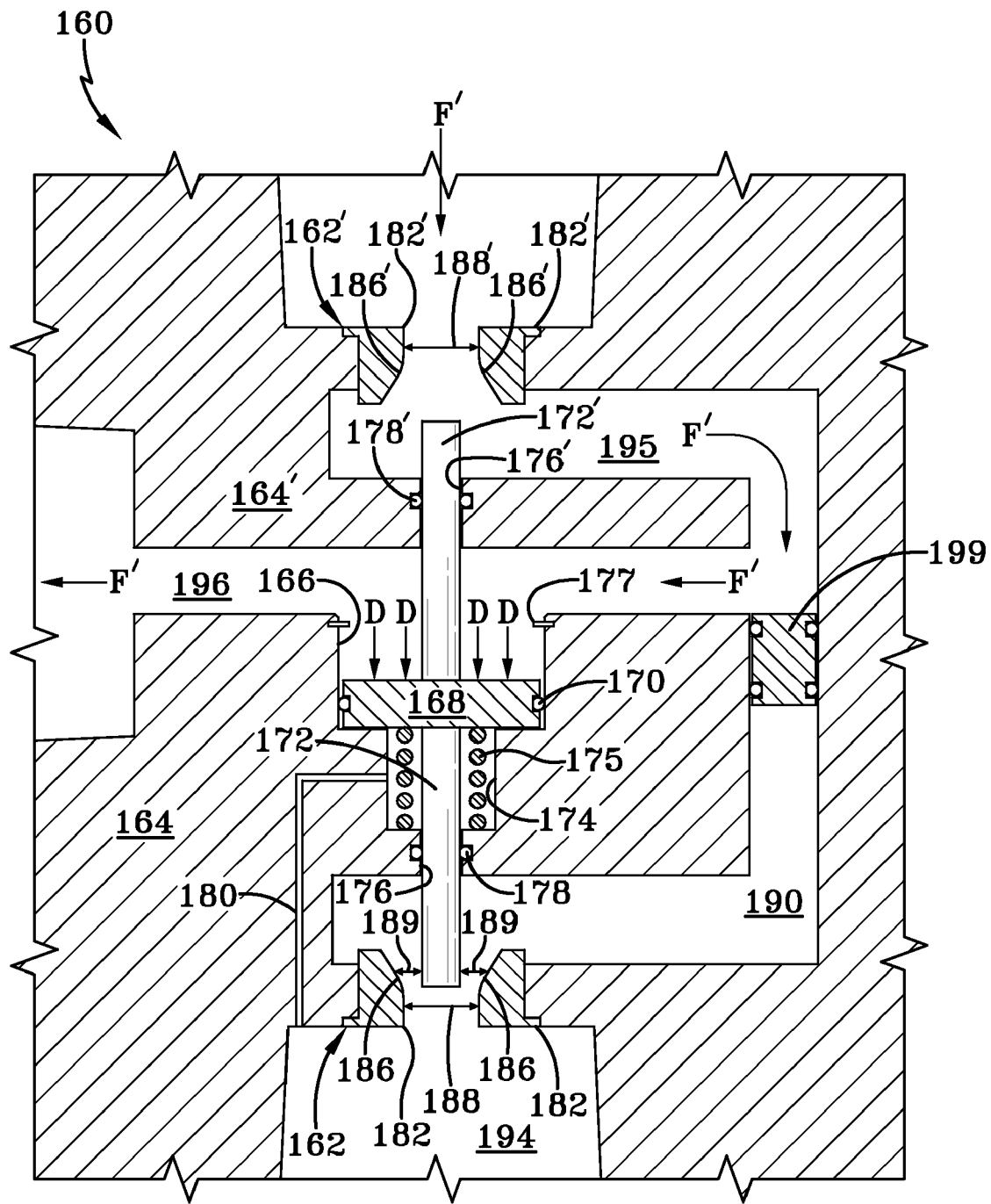
FIG. 7 is a view similar to FIG. 6, but showing the air reservoir/air spring throttle assembly in a non-throttled position and the air spring/atmosphere throttle assembly in a throttled position.

It is also contemplated that other arrangements of the throttle assembly, such as placement of a second throttle assembly between and in fluid communication with the air reservoir and the air spring, as shown in FIGS. 6 and 7, may also be used without affecting the overall concept of the invention.

More specifically, when a vehicle is lightly loaded or unloaded the problem of dynamic ride height drift also can occur, but is the opposite of the drift encountered when the trailer is significantly loaded, so that the vehicle frame is raised above the design ride height rather than below it. In this situation, when the axle/suspension system articulates so that one or more of the air springs is in a compressed position and the height control valve of the prior art directs the flow of air from the air reservoir to the air spring, the air spring may inflate so rapidly that it becomes overly extended, causing the vehicle frame to be raised above the design ride height. Over time, this drift can cause the vehicle frame to rise considerably above design ride height. Although this problem generally will not damage the integrity or performance of the axle/suspension system, damage to the vehicle can potentially occur because exceeding design ride height could potentially cause the vehicle to collide with highway infrastructure such as fixed-height tunnels or highway overpasses. In order to minimize or prevent the possibility of over-inflation of the air spring when the vehicle is unloaded or lightly loaded, a throttle assembly may be disposed between and in fluid communication with the air reservoir and the air spring Turning now to FIGS. 6 and 7, an exemplary second embodiment of the height control valve of the present invention is schematically shown and is indicated generally at 160. The general external appearance, control arm disposition and operation, and installation of height control valve 160, is similar to that of exemplary first embodiment height control valve 60, with the principal difference being the internal structure and function of the valve which includes a dual throttle assembly that can regulate both the rate of air flow from the air reservoir to the air spring when the height control valve is in a fill position, and the rate of air flow from the air spring to atmosphere when the height control valve is in an exhaust position More particularly, because the operation of height control valve 160 in regulating the rate of air flow from the air spring to atmosphere when the height control valve is in an exhaust position is identical to the operation of height control valve 60 described in detail above, only the operation of height control valve 160 with respect to the regulation of the rate of air flow from the air reservoir to the air spring when the height control valve is in a fill position will now be described An exemplary second embodiment of the present invention is shown in FIG. 6 and includes a first air spring/atmosphere throttle assembly 162 which is identical to throttle assembly 62, set forth above in height control valve 60, and comprising: a throttle assembly body 164, a cylinder 166, a piston 168, an o-ring 170, a first plunger 172, a chamber 174, a spring 175, a plunger opening 176, a positive stop 177, an o-ring 178, a vent channel 180, a tapered ring 182, a tapered inner wall 186, a ring opening 188, a space 189, a valve exhaust conduit 190, and an exit chamber 194 A second throttle assembly 162' is generally disposed between and in fluid communication with a valve air reservoir conduit 195 and a valve air spring conduit 196. This arrangement allows throttle assembly 162' of height control valve 160 to regulate or reduce the rate of flow of air from the air reservoir into the air spring when the valve is in a fill position, thereby preventing the air spring from inflating too rapidly and becoming overly extended when the vehicle is unloaded or lightly loaded, and thus allowing the vehicle to maintain design ride height.

More particularly, height control valve 160 includes throttle assembly 162' operatively connected to piston 168 More specifically, a second plunger 172' generally opposes first plunger 172 and extends from piston 168. Second plunger 172' passes through a plunger opening 176' that is formed in a throttle assembly body 164' An O-ring 178' is secured to throttle assembly body 164' in plunger opening 176' to prevent air from flowing through valve air reservoir conduit 195 into valve air spring conduit 196.

Referring now to FIG. 6, when the vehicle is unloaded or lightly loaded/substantially unloaded and the air spring becomes compressed due to articulation of the axle/suspension system, control lever 24 is urged into fill position B, and a valve baffle 199 is urged into valve exhaust conduit 190, which in turn allows air F from the air reservoir to flow through air reservoir conduit 38 (FIG. 2), to height control valve 160, through a tapered ring 182', into valve air reservoir conduit 195, into valve air spring conduit 196, into air spring conduits 42 (FIG. 2), and into air springs 24 (FIG. 2), thus filling the air springs and raising the vehicle frame to maintain design ride height. As air pressure D' in height control valve 160 decreases, piston 168 is biased by spring 175 against positive stop 177 and urges plunger 172' in the direction of tapered ring 182' disposed in throttle assembly body 164'. Tapered ring 182' is formed with a decreasing inner diameter facilitated by a tapered inner wall 186' of the ring, thereby defining a ring opening 188'. Alternatively, tapered ring 182' may be formed as an integral part of throttle assembly body 164'. Plunger 172' preferably includes a generally constant outer diameter that is smaller than the minimum inner diameter of tapered ring 182', which enables the plunger to pass freely into ring opening 188', thereby in turn defining a space 189' between the plunger and ring wall 186'. Due to the taper of ring wall 186', the effective size of space 189' between plunger 172' and the ring wall decreases as air pressure D' decreases That is, when the vehicle is unloaded and the air pressure D' is lower, plunger 172' enters ring opening 188', and thus space 189' between the plunger and ring wall 186' is smaller than when the air pressure increases, which urges the plunger away from the ring opening. In this manner, as air pressure D' decreases, plunger 172' is urged into opening 188', and thus the effective size of space 189' between the plunger and the ring wall is smaller, allowing a lower late of air flow from the air reservoir to the air springs, and minimizing the possibility of air springs 24 becoming over inflated In this manner, the movement of plunger 172' into ring opening 188', which increases as air pressure D' decreases, enables height control valve 160 to restrict the flow of air from the air reservoir to air springs 24 when the vehicle is unloaded or lightly loaded and executes a maneuver, such as a hard turn, which causes axle/suspension system 10 to articulate to a position that compresses air springs 24 This structure and function of height control valve 160 and its throttle assembly 162' thus prevents the undesirably rapid inflation of air springs 24 when the vehicle is unloaded or lightly loaded and the air springs are temporarily compressed, reducing over-inflation of the air springs. Reduction of over-inflation of air springs 24 in turn enables the vehicle to maintain the design ride height and reduces potential damage to the vehicle and to highway infrastructure With reference now to FIG. 7, height control valve 160 and throttle assembly 162' are shown in a state when the vehicle is significantly loaded, which increases the load on air springs 24 (FIG. 1). Because the load on air springs 24 is increased, the air pressure in the air springs is also increased, which in turn reduces the natural rate of flow F' from the air reservoir to the air springs when height control valve 160 is activated to fill the air springs, as the pressure differential between the air reservoir and the air spring is reduced Because air flow F' into air springs 24 is reduced, the potential for over-inflation of the air springs is also reduced. Accordingly, height control valve 160 accounts for this and provides less air flow restriction between the air reservoir and the air springs, when compared to the unloaded or lightly loaded vehicle situation shown in FIG. 6

More specifically, the increased air pressure in air springs 24 creates an increased air pressure D acting on piston 168 The increased air pressure D provides an increased force on piston 168, which overcomes the bias of spring 175, moving plunger 172' away from opening 188'. Without plunger 172' extending into ring opening 188', the maximum fill opening size is available, thereby allowing more air F' to pass from the air reservoir to the air springs.

As shown in FIGS. 4-7, throttle assemblies 62, 162 and 162' of height control valves 60 and 160, respectively, may include a variable restriction that reacts proportionally to the load on air springs 24, or alternatively, the throttle assemblies may have discrete settings based on predetermined pressure levels, without affecting the overall concept of the invention. In addition, throttle assemblies 62, 162, and 162' may open or close based upon reference to the pressure differential between the vehicle air reservoir and the pressure in air springs 24, also without affecting the overall concept of the invention It is contemplated that other types of throttle assemblies used to restrict air flow such as a butterfly or solenoid-type assemblies may be used without affecting the overall concept or operation of the invention.

It is further contemplated that more than one height control valve may be used with each vehicle, axle/suspension assembly, or air spring, such as one height control valve per axle/suspension assembly or one height control valve per air spring, to provide an enhanced degree of height control for the vehicle, without affecting the overall concept of the invention. This is especially important where very flexible axle/suspension systems are utilized.

It is even further contemplated that separate independent throttle assemblies may be used with one height control valve, such as a first independent throttle assembly between the air reservoir and the air spring to regulate air supply and a separate second independent throttle assembly between the air spring and atmosphere to regulate air exhaustion, without affecting the overall concept or operation of the invention.

It is yet even further contemplated that the throttle assemblies may be separate from the height control valve, such as a remote throttle assembly that is pneumatically connected to the height control valve, without affecting the overall concept or operation of the invention As noted above, while reference has been made to a particular trailing arm air-ride axle/suspension system, the invention also applies to other types of air-ride axle/suspension systems, such as other types of trailing arm and leading arm air-ride suspension assemblies Moreover, the invention applies to various types of frames used for heavy-duty vehicles, including primary frames that do not support a subframe and primary frames and/or floor structures that do support a subframe For primary frames and/or floor structures that do support a subframe, the subframe can be non-movable or movable, the latter being commonly referred to as a slider box The present invention has been described with reference to a specific exemplary embodiment It is understood that these descriptions and illustrations are by way of example and not by way of limitation. Potential modifications and alterations will occur to others upon a reading and understanding of this disclosure, and it is further understood that the invention includes all such modifications and alterations and equivalents thereof Accordingly, the improved height control valve for an air-ride axle/suspension system of a heavy-duty vehicle is simplified, provides an effective, safe, inexpensive, and efficient structure which achieves all the enumerated objectives, provides for eliminating difficulties encountered with prior art height control valves for heavy-duty vehicle air-ride axle/ suspension systems, and solves problems and obtains new results in the art In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved height control valve for a heavy-duty vehicle air-ride axle/ suspension system is constructed, arranged and used, the characteristics of the construction and arrangement, and the advantageous, new and useful results obtained; the new and useful structures, devices, elements, arrangements, parts and combinations are set forth in the appended claims.

What is claimed is:

1. A height control valve for an air spring of an air-ride axle/suspension system of a heavy-duty vehicle, said valve comprising:
   a) a valve body being in fluid communication with an air reservoir; with said air spring, and with atmosphere;
   b) actuation means operatively connected to said valve body and said axle/suspension system for actuating said valve; and
   c) a throttle assembly incorporated into said valve body, so that upon actuation of said valve by said actuation means when said vehicle is in a loaded condition and said air spring is in an extended state during vehicle operation for exhausting fluid from said air spring, said throttle assembly regulates a rate of flow of said fluid from the air spring to generally maintain a predetermined ride-height of said vehicle.

2. The height control valve for an air spring of an air-ride axle/suspension system of a heavy-duty vehicle of claim 1, wherein said throttle assembly decreases said rate of fluid flow from said air spring when a pressure in said air spring is increased.

3. The height control valve for an air spring of an air-ride axle/suspension system of a heavy-duty vehicle of claim 1, wherein said throttle assembly further comprises:
   a) a chamber formed in said valve body;
   b) a plunger disposed in said chamber, said plunger having an end;
   c) a tapered ring connected to said valve body and having an inner diameter, wherein said plunger end is urged into said tapered ring inner diameter when a pressure in said air spring is increased.

4. The height control valve for an air spring of an air-ride axle/suspension system of a heavy-duty vehicle of claim 3, further comprising:
   a cylinder mounted on said plunger; said pressure acting on said cylinder, wherein said urging is increased when said pressure is increased 5. The height control valve for an air spring of an air-ride axle/suspension system of a heavy-duty vehicle of claim 4, wherein said throttle assembly is an integral part of said valve body.

6. The height control valve for an air spring of an air-ride axle/suspension system of a heavy-duty vehicle of Claim 1, wherein said actuation means is a control arm.

7. A height control valve for an air spring of an air-ride axle/suspension system of a heavy-duty vehicle, said valve comprising:
   a) a valve body being in fluid communication with an air reservoir, with said air spring, and with atmosphere;
   b) actuation means operatively connected to said valve body and said axle/suspension system for actuating said valve; and
   c) a throttle assembly incorporated into said valve body, so that upon actuation of said valve by said actuation means when said vehicle is in a substantially unloaded condition and said air spring is in a compressed state during vehicle operation for filling fluid into said air spring, said throttle assembly regulates a rate of flow of said fluid into the air spring to generally maintain a predetermined ride-height of said vehicle.

8. The height control valve for an air spring of an air-ride axle/suspension system of a heavy-duty vehicle of claim 7, whereby said throttle assembly decreases said rate of fluid flow from said air reservoir to said air spring when a pressure in said air spring is decreased.

9. The height control valve for an air spring of an air-ride axle/suspension system of a heavy-duty vehicle of claim 7, wherein said throttle assembly further comprises:
   a) a chamber formed in said valve body;
   b) a plunger disposed in said chamber, said plunger having an end;
   c) a tapered ring connected to said valve body and having an inner diameter, wherein said plunger end is urged into said tapered ring inner diameter when a pressure in said air spring is decreased.

10. The height control valve for an air spring of an air-ride axle/suspension system of a heavy-duty vehicle of claim 9, further comprising:
    a cylinder mounted on said plunger; said pressure acting on said cylinder, wherein said urging is decreased when said pressure is increased 11. The height control valve for an air spring of an air-ride axle/suspension system of a heavy-duty vehicle of claim 10, wherein said throttle assembly is an integral part of said valve body.

12. The height control valve for an air spring of an air-ride axle/suspension system of a heavy-duty vehicle of claim 7, wherein said actuation means is a control arm.

* * * * *

UNITED STATES PATENT AND TRADEMARK OFFICE
CERTIFICATE OF CORRECTION

PATENT NO. : 7,621,537 B2  Page 1 of 1
APPLICATION NO. : 11/555840
DATED : November 24, 2009
INVENTOR(S) : Pierce et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 527 days.

Signed and Sealed this

Twenty-sixth Day of October, 2010

David J. Kappos
*Director of the United States Patent and Trademark Office*